Jan. 27, 1953 R. E. MEYERS 2,626,527
SNAP ACTION VALVE MECHANISM FOR RECIPROCATING PISTONS
Filed Dec. 15, 1948 2 SHEETS—SHEET 1

INVENTOR.
ROBERT E. MEYERS
BY Cecil J Arens
ATTORNEY

Jan. 27, 1953   R. E. MEYERS   2,626,527
SNAP ACTION VALVE MECHANISM FOR RECIPROCATING PISTONS
Filed Dec. 15, 1948   2 SHEETS—SHEET 2

INVENTOR.
ROBERT E. MEYERS
BY Cecil F Arens
ATTORNEY

Patented Jan. 27, 1953

2,626,527

UNITED STATES PATENT OFFICE 2,626,527

SNAP ACTION VALVE MECHANISM FOR RECIPROCATING PISTONS

Robert E. Meyers, South Bend, Ind., assignor to Bendix Aviation Corporation, South Bend, Ind., a corporation of Delaware Application December 15, 1948, Serial No. 65,443

4 Claims. (Cl. 74—97)

This invention relates to an actuating mechanism for a valve which is used to control the flow of fluid to a fluid operated motor.

An object of the invention is to provide a novel mechanism to be operated by the piston at the end of its stroke for reversing the application of fluid to a fluid motor.

Another object of the invention resides in the provision of a valve actuating mechanism which receives its actuating force from springs.

The above and other objects and features of the invention will be apparent from the following description of the apparatus taken in connection with the accompanying drawings which form a part of this specification and in which.

Figure 1:
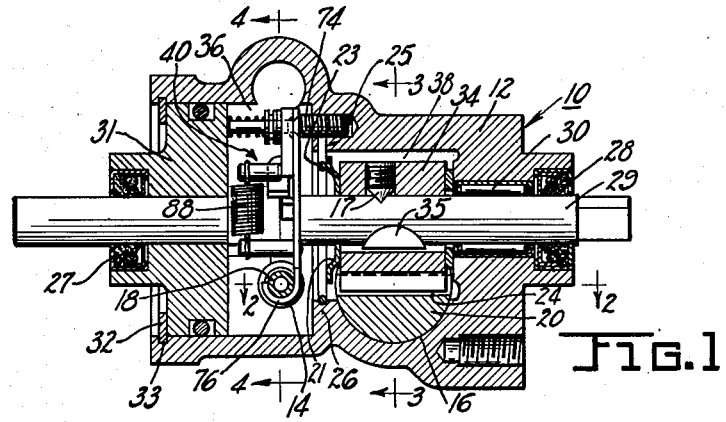
Figure 1 is a view in section of a windshield wiper motor mechanism incorporating the apparatus of the invention.

Referring now to the drawings and more particularly to Figure 1 the reference numeral 10 designates a fluid motor mechanism comprising a housing 12 provided with parallel bores 14 and 16. The bore 14 receives a slidable spool valve 18, and the bore 16 is formed to accommodate a piston 20 with which a gear rack 24 is integral.

Bores 14 and 16 are provided with chambers 36 and 38 respectively located intermediate the ends of the bores. Chamber 38 extends through partition 26 and is constructed and arranged to receive a shaft 29 disposed at right angles to the piston. The shaft is supported at one end by a bearing 30 and at its opposite end by an end plate 31 retained within the housing 12 by a split washer 32 which fits into an angular recess 33 of the housing. A seal 27 is pressed into the end plate 31 concentric with one end of shaft 29 to thereby seal chamber 36 from atmosphere, and a seal 28 is pressed into the housing 12 concentric with the other end of the shaft 29 so as to seal chamber 38 from atmosphere. The shaft 29 is equipped with a gear sector 34 arranged in meshing relationship to said rack. The gear sector is fixedly secured to the shaft by a key 35 and a set screw 17. The gear sector is held in meshing engagement with the rack by a cupped washer 21 and a triangularly shaped split ring 23 which has its apices in engagement with an angular recess 25 located in the housing 12. Chamber 36 houses a valve actuating mechanism 40. The spool valve 18 is provided with lands 42 and 44 at its ends for controlling communication between the ends of the bore 16 and a fluid pressure source, not shown, and an outlet opening 46 communicating with chamber 36. The lands 42 and 44 are machined and then lapped to slidably fit into sleeves 50 and 52 respectively which are pressed into the bore 14. These sleeves are formed with circumferential external grooves 54 and 56 having radial passages 58 and 60 respectively for communicating the interior of the sleeves with said external grooves. Passages 62 and 64 connect the external grooves 54 and 56 respectively of sleeves 42 and 44 with the ends of the bore 16. Except for these passages the ends of bore 16 are closed. Each end of bore 16 is equipped with an end member 63 removable for the insertion of the piston 20. These end members are constructed and arranged to seal the ends of the bore from leakage to atmosphere. Sealing rings 65 are carried by the ends of piston 20 to prevent leakage from the ends of the bore 16 to chamber 38. The spool valve 18 is reduced in diameter or necked down at 66 and 68 to permit the free passage of fluid to chamber 36 via the space between the interior of the sleeves and the spool valve. The right end of bore 14 is furnished with a closure member 67. The left end of the bore 14 is equipped with a threaded port 69, adapted to be connected to a fluid pressure source, not shown. With the spool valve in the position shown in Figures 2 and 4 fluid will flow freely from the right end of bore 16 thru passage 64, into external groove 56 of the sleeve 44 through the radial passages 60, into the space between the reduced diameter 68 of the spool valve and the interior of the sleeve, and thence to chamber 36. With the spool valve shifted to the left, so that the land 42 is to the left of radial passage 58 in sleeve 50, fluid will pass freely from the left end of bore 16 through passage 62, exterior groove 54, radial passages 58, into the space between the reduced diameter 66 of the spool valve and the sleeve, and thence to the chamber 36. The spool valve is provided with a longitudinal bore 70 for communicating the right end of the bore 14 with the left end.

Figure 2:
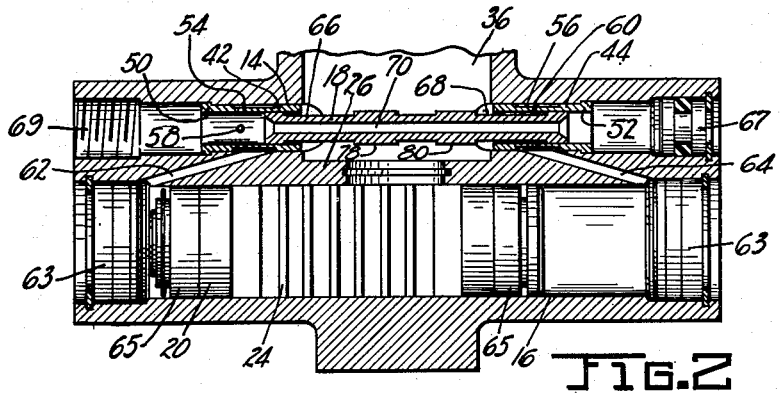
Figure 2 is a view in section taken on the lines 2—2 of Figure 1.
Figure 3:
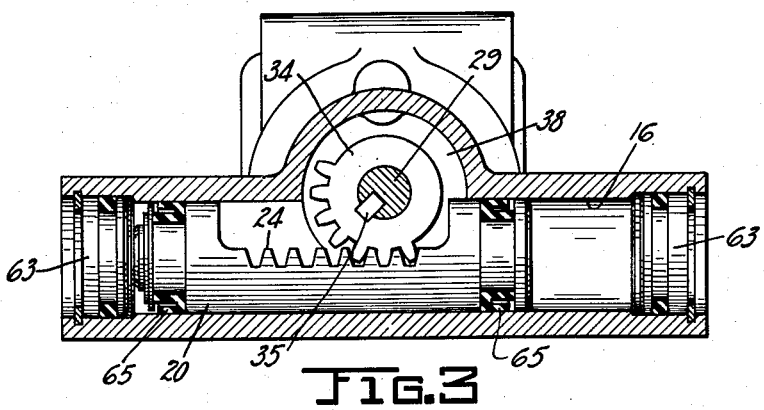
Figure 3 is a view in section taken substantially on the lines 3—3 of Figure 1.
Figure 4:
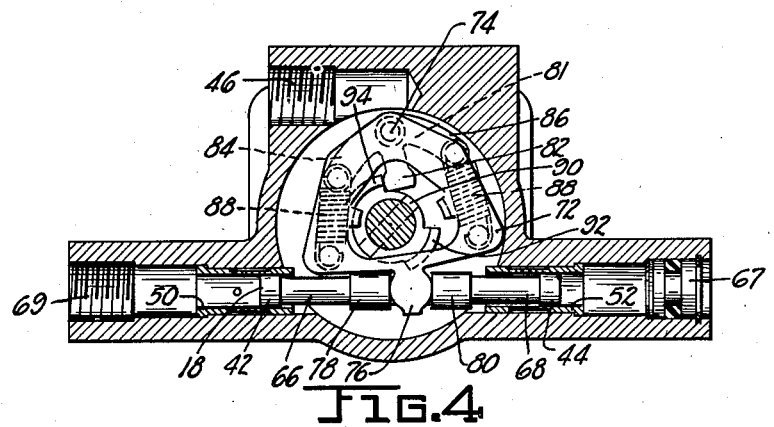
Figure 4 is a view in section taken substantially on the lines 4—4 of Figure 1.
Figure 5:
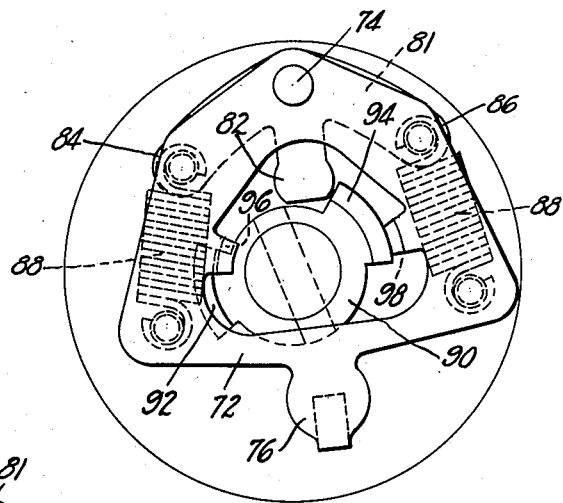
Figures 5 and 6 are views of the actuating mechanism of the invention shown in different positions of operation.
Figure 6:
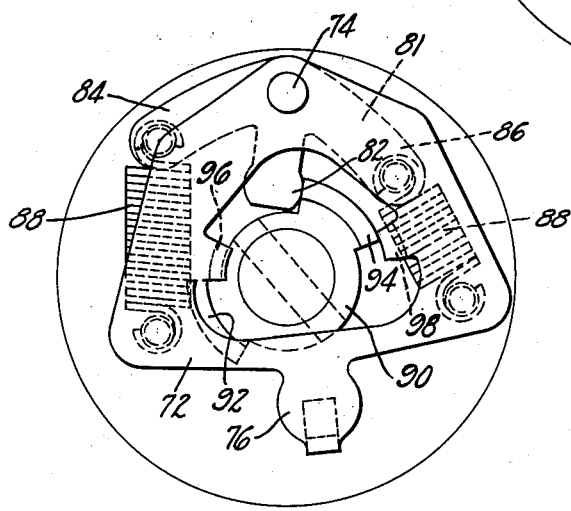

To shift the spool valve 18 at the proper time, to thereby reverse the application of fluid under pressure to the piston, the valve actuating mechanism 40 is provided. This mechanism comprises an actuating lever 72 pivotally carried in the chamber 36 by a pin 74 mounted in the housing 12. The free end of the actuating lever is formed with a depending portion 76 which engages with shoulders 78 and 80 of the spool valve. A yoke 81 is also pivotally carried by the pin 74. The yoke is arranged to be rotated relative to the actuating lever 72. The yoke is formed with a center finger 82 and oppositely extending arms 84 and 86. Two coil springs 88 are provided, and each is carried at one end by the arms 84 and 86 respectively, with the other ends of the springs fastened to the actuating lever 72. This connection between the yoke and actuating lever provides a yieldable driving connection between these two members. An interlock actuator or coupling 90 is securely fastened to the shaft 29 for rotating the yoke 81 against the action of the springs 88 to thereby build up a force in said springs for rotating said actuating lever. This interlock coupling also serves to control the action of the actuating lever 72 to thereby control the position of the spool valve at the end of each piston stroke. The interlock coupling 90 is formed with circumferential axial extending flanges 92 and 94 which cooperate with lugs 96 and 98 carried by the actuating lever, to thereby prevent rotation of the actuating lever and hence movement of the spool valve until the piston has traveled to the end of its stroke. Figures 2 and 4 show the position of the spool valve after the actuating lever 72 has been rotated counterclockwise under the influence of the spring 88, on the right. It will be noted that it is not until the flange 92 has rotated clockwise beyond the lug 96 that the actuating lever will be allowed to swing to the right or counterclockwise under the influence of the spring 88. Clockwise motion of the shaft 29 rotates the flange 92 into engagement with the center finger 82 and counterclockwise motion of the shaft rotates the flange 94 into engagement with the finger 82 of the yoke. As shown the spool valve will admit fluid to the left end of the bore 16 to thereby tend to urge the piston to the right which will cause shaft 29 to rotate counterclockwise. Flange 94 of the interlock coupling will now be moved into engagement with the finger 82 so as to tend to swing the yoke and actuating lever to the left or clockwise. However, only the yoke can be swung to the left at this time, that is, during the initial engagement between the flange 94 and finger 82, the actuating lever cannot swing to the left since the lug 98 is riding against the outer side of the flange 94, as best shown in Figures 5 and 6. During the time that the lug 98 is riding against flange 94, flange 92 is moving behind the lug 96 and out of contact therewith. Continued rotation of the yoke under the driving action of the interlock coupling will stretch the spring 88 on the left. This spring will continue to stretch, that is, be put under tension until the interlock coupling has rotated counterclockwise to a position where the lug 98 no longer rides on the flange 94, at which time the actuating lever will be shifted to the left under the influence of the spring which is located on the left side. This movement of the actuating lever slides the spool valve to the left so that the right end of bore 16 will be connected to the inlet port. At this time the piston is to the right end of the bore 16, which bore is now connected to the inlet at its right end and to the outlet port at its left end for movement of the piston to the left end of the bore 16, to thereby complete a cycle. The flange 92 and lug 96 cooperate during movement of the piston to the left, so as to defer shifting of the spool valve, in the same manner that the flange 94 and lug 98 cooperate when the piston is being moved to the right as aforementioned.

Although the invention has been described in connection with certain specific embodiments, the principles are susceptible of numerous other applications that will readily occur to persons skilled in the art.

Having thus described the various features of the invention, what I claim as new and desire to secure by Letters Patent is:

1. A valve actuating mechanism comprising a valve member to be actuated, a rotatable element, an actuating lever pivotally supported at one end with the other end operatively connected to the valve member, a yoke member pivotally carried about the same axis as the actuating lever and relatively movable with respect thereto, said yoke member being provided with oppositely extending arms and a depending member located intermediate said arms, a spring interconnecting each of the arms to said actuating lever, and a coupling device carried by the rotatable element and constructed and arranged for engagement with said depending member for imparting rotation to said yoke, said device being equipped with means for engaging said actuating lever for holding the same against rotation until said rotatable element has rotated a predetermined distance, at which time said actuating lever is disengaged for moving said valve member.

2. A valve actuating mechanism comprising a valve member to be actuated, a rotatable element, an actuating lever pivotally supported at one end with the other end operatively connected to the valve member, a yoke member pivotally carried about the same axis as the actuating lever and relatively movable with respect thereto, two springs, one on each side of the pivotal axis of said yoke and actuating lever and connecting the latter to the former, a finger carried by the yoke member, and a coupling device carried by the rotatable element and constructed and arranged for engagement with said finger for imparting rotation to said yoke, said coupling device being equipped with means for engaging said actuating lever for holding the same against rotation until said rotatable element has rotated a predetermined distance, at which time said actuating lever is disengaged for moving said valve member.

3. A valve actuating mechanism comprising a valve member to be actuated, a rotatable element, an actuating lever pivotally supported at one end with the other end operatively connected to the valve member, a yoke member pivotally carried about the same axis as the actuating lever and relatively movable with respect thereto, means connecting the yoke member to the actuating lever on each side of the pivotal axis of said yoke and actuating lever to provide a yieldable driving connection therebetween, a finger carried by the yoke member, and an interlock actuator carried by the rotatable element and constructed and arranged for engagement with said finger for imparting rotation to said yoke, said interlock actuator being equipped with means for engaging said actuating lever for holding the same against rotation until the rotatable element has rotated a predetermined distance, at which time said actuating lever is disengaged for moving said valve member under the influence of the yieldable means.

4. A valve actuating mechanism comprising a valve part to be actuated, a rotatable element, two relatively movable members pivotally carried about the same axis and interconnected by yieldable means, and a coupling device carried by the rotatable element and formed with oppositely disposed circumferential edges, one of said members being formed with a finger for engagement by said device when the rotatable element is rotated in either direction, the other of said movable members being operatively connected to the valve part, said other member being provided with lugs which ride on one or the other of said edges depending on the direction of rotation of said rotatable element to defer rotation of said other member until said rotatable element has rotated a predetermined distance.

ROBERT E. MEYERS.

REFERENCES CITED

The following references are of record in the file of this patent:

UNITED STATES PATENTS

| Number | Name | Date |
| --- | --- | --- |
| 2,332,664 | Orshansky et al. | Oct. 26, 1943 |
| 2,404,315 | Rotter et al. | July 16, 1946 |